Nov. 10, 1953

R. H. CARSON 2,658,955

TAPE RECORDER FEED MECHANISM

Filed July 18, 1945

2 Sheets-Sheet 1

Inventor:
Robert H. Carson
by William D. Hall
Attorney

Inventor:
Robert H. Carson
By William D. Hall,
Attorney

Patented Nov. 10, 1953 2,658,955

UNITED STATES PATENT OFFICE 2,658,955

TAPE RECORDER FEED MECHANISM

Robert H. Carson, Arlington, Mass., assignor to the United States of America as represented by the Executive Secretary of the Office of Scientific Research and Development Application July 18, 1945, Serial No. 605,782

8 Claims. (Cl. 179—100.2)

This invention relates to magnetic recording devices and especially to mechanical means for controlling the movement of magnetic recording tape. More particularly the invention is concerned with a magazine and feed mechanism for a magnetic tape winding.

In one specific aspect the invention deals with means for recording and reproducing messages of relatively short duration such as are commonly encountered in connection with military operations. An instance of this is where an observation plane is on reconnaissance duty and the pilot reports back to his ship information relating to enemy movements. The message may be of very short duration such as for a period of one minute, thirty seconds, or even fifteen seconds; and since it may be transmitted and received in a high ambient noise field, there arises a need for quickly repeating or playing back the message in order to be sure of the meaning. In this connection it may be necessary to repeat a message several times, and it may be essential that the repeated messages follow one another in rapid succession. In the same type of work, it may also be highly desirable to provide means for erasing messages which are no longer of interest and for quickly adjusting or repairing the magnetic equipment, especially the tape, in case of a breakdown.

Several difficulties are encountered in playing back messages of short duration owing to the fact that endless recording tape of short length must be continuously wound upon itself at one point, and simultaneously unwound at another point. In this operation a great deal of variation in tension is likely to develop. Since the speed of movement of the tape past a recording head must be constant for satisfactory operation, it is essential to provide for elimination of non-uniform tension and to maintain smooth feeding of the tape at all points.

An object of the invention, therefore, is to improve generally magnetic recording devices and to provide mechanical means for controlling the movement of recording tape, in an effort to avoid difficulties of the type above noted.

I have devised an improved magnetic tape magazine which is adapted to cooperate with magnetic heads such as a recording head, a play-back head or reproducing head, or an erasing head. The magazine is designed to hold an endless tape winding for use in recording messages of short duration during military operations.

An important feature of the invention is the combination of a replaceable magazine and a magnetic tape so arranged in the magazine that it may be readily entered and removed from a magnetic head at will.

Another object of the invention is the arrangement of a relatively short lentgh of magnetic tape in a magazine in order to provide means for quickly repeating short messages.

Another feature is the provision of means for maintaining a relatively smooth uniform delivery of the tape from the magazine to a magnetic head.

Another feature is the combination with driving means of a guide member which cooperates with the magazine to provide for a uniform and positive winding operation within the magazine while the tape is being unwound at another point. Other features will appear from the following description.

Figures 1, 2:
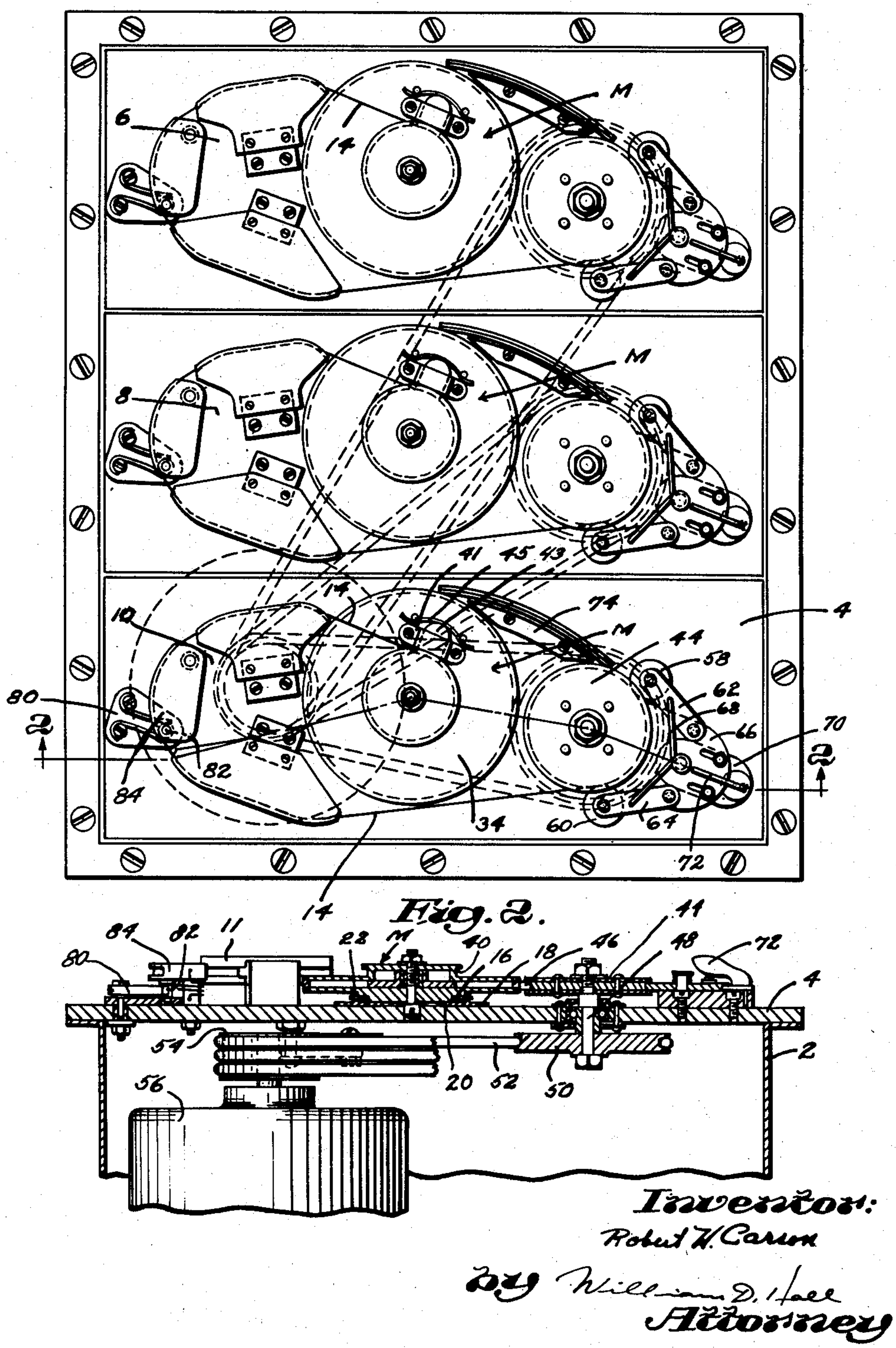
Fig. 1 is a plan view of a magnetic recording apparatus in which a plurality of magazines of the invention are shown.
Fig. 2 is a fragmentary vertical cross section of the recording device.

The structure illustrated in the drawings represents a preferred embodiment of the invention and especially one that has been designed for the specific purpose of handling messages received in military operations of the type discussed. It should be understood, however, that the invention is not limited to the particular form shown and may be practiced in various other forms and for various other purposes in which the various flexibility features, as well as improved winding and guiding operations of the invention may be used, either separately or in conjunction with one another.

Considering the invention more in detail, 2 denotes a housing for recording equipment. The housing consists of a box-like member provided at its upper side with a supporting place or base 4 as may be observed from an inspection of Fig. 2. The housing has been partly broken away in the figure noted, also a front panel member has been removed, and no electrical wiring has been shown.

Mounted on the base plate are three complete recording assemblies 6, 8, 10 (Fig. 1). Each unit contains a magnetic recording head, a magnetic erasing head and a magnetic play-back or repeating head, all of conventional design. For each recording assembly I have provided its respective magazine unit and since each of these units is similar in all respects, the invention will be further described in connection with the recording assembly 10, shown at the bottom of Fig. 1.

Figure 3:
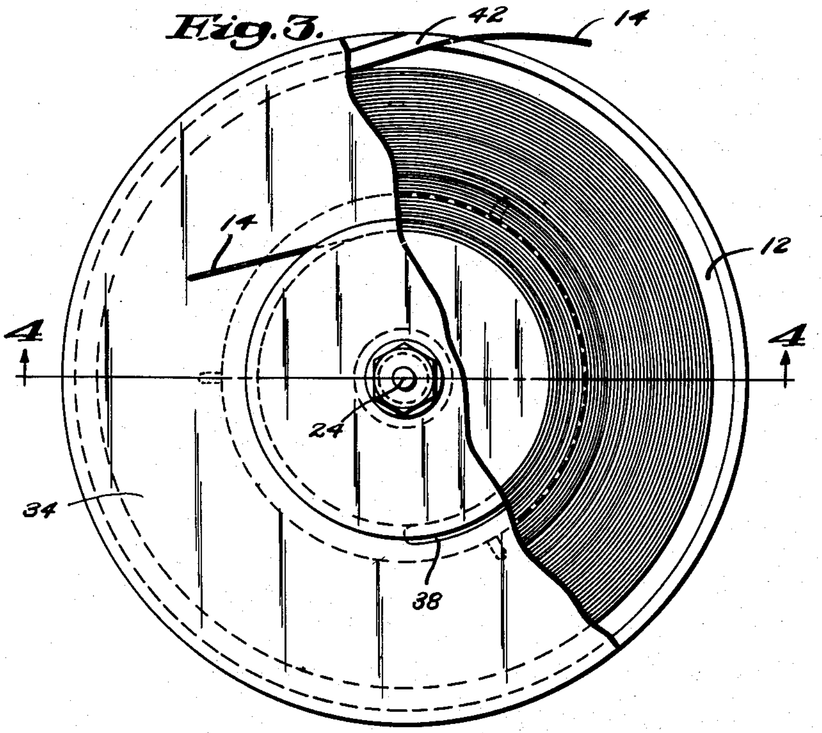
Fig. 3 is a plan view partly broken away to disclose a magnetic tape winding contained therewithin.

The magazine member has been noted by the letter M and comprises a thin cylindrical casing 12, mounted on the base 4 adjacent to the recording head 11 and adapted to receive a winding of an endless magnetic tape 14, as shown in Fig. 3. The under side of the casing is formed with a cylindrical base of reduced diameter, in which are secured radially extending pins 16. The casing is adapted to be detachably secured in a socket member 18 and installation of the magazine is carried out by forcing it downwardly against resilient tabs 20 and engaging the pins 16 in elongated slots 22 formed in the side of the socket.

Figure 4:
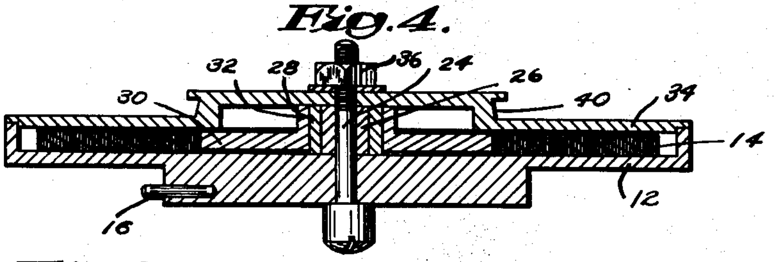
Fig. 4 is a symmetrical cross section of the magazine member.
Figure 5:
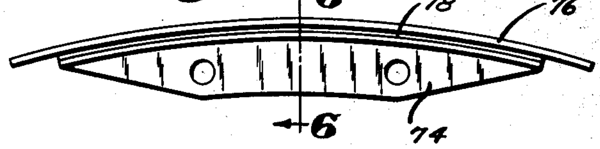
Fig. 5 is a detail view of a guide member.
Figure 6:
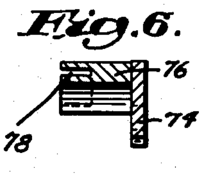
Fig. 6 is a cross section taken on the line 6—6 of Fig. 5.

The casing 12 is provided with an axially disposed shaft 24 which carries a bearing member 26 on which is slidably disposed a sleeve member 28. Mounted on the sleeve member 28 is a disc 30, around which is disposed the magnetic tape winding as shown in Figs. 3 and 4. Numeral 34 denotes a cover member which is fitted to engage over the edges of the casing 12 against a cylindrical projection 32, in a position such that the disc member 30 and the tape winding are loosely disposed between the cover member and the casing, thus permitting the disc member to rotate freely on the shaft 24. The cover member is preferably secured by some suitable means as a nut 26 threaded about the shaft 24.

The cover member is further formed with a drum portion of reduced diameter having a conical outer surface 40. A portion of the cover adjacent to the conical surface has been cut away to provide a curved slot 38 and that part of the conical surface which is thus exposed constitutes a peripheral surface which just coincides with the adjacent peripheral surface of the disc 30, thus providing a passageway of limited circumstances through which the innermost coil or turn of the tape may be withdrawn in an angular direction relative to the axis of the disc. Numeral 43 refers to a plunger member secured by a strap 41 and having a curved end which is resiliently urged against the conical surface 40 by means of a spring 45.

The outer edge of the casing 12 is formed with a slot 42 which provides a passageway through which the magnetic tape 14 may be led to be coiled into the winding as shown in Fig. 3.

The tape is continuously wound around the outer side of the winding shown, and at the same time is continuously unwound at the inner side of the winding. As it passes out through the curved slot 38, the tape tends to follow an angular path and when drawn into a path of movement whose axis is at right angles to the axis of disc 30, such as is desired in going to the magnetic head, it becomes twisted or warped. The purpose of the conical surface is to provide a bearing along which the twisted section of the tape is allowed to pass and from which the tape is delivered in an untwisted or substantially straight condition. This permits rapid and uniform uncoiling of the tape winding and thus makes it possible to pack or store an endless tape in a magazine of the character described. The plunger 43 serves to hold the tape firmly against the conical surface and the plunger is preferably arranged in circumferentially spaced relation to the curved slot 38 to provide for a substantial arc of contact of the tape on the conical surface before passing to the magnetic head, as shown in Figs. 1 and 3. It should also be observed that without the plunger the tape tension as it comes from the magazine varies with the condition of the winding. However, by applying a frictional force with the plunger member the tension of the tape, within certain units, becomes independent of the condition of the winding.

Movement of the magnetic tape into and out of the magazine member is induced by means of a driving roller 44 which is formed with a groove 46, around which the tape passes. The driving roller is located on an opposite side of the magazine M and is fixed to a shaft 48 which extends vertically through the base plate 4. Secured at the lower end of the shaft, in spaced relation to the under side of the plate, is a pulley 50 which is driven by a belt 52, in turn actuated by pulley 54 connected to an electrical motor 56. The motor 56 is mounted in some convenient manner within the housing 2, and preferably carries two other sets of pulleys and belts which are utilized to drive other magazines for the assemblies 6 and 8 shown in Fig. 1.

Cooperating with the driving pulley 44 are two pressure rollers 58 and 60. These two pressure rollers are pivotally mounted at the ends of two links 62 and 64, which are in turn pivoted in a block 66. A spring member 68 is mounted on the block and has its extremities spaced apart and connected to respective links 62 and 64 in the manner shown in Fig. 2, tending to urge the links and rollers toward one another. The block 66 is slidably disposed on the base 4 and movement horizontally with respect to the base is provided for by a cam member 70, having a handle 72. When the handle is rotated, the cam member thrusts the links and rollers toward the driving pulley and the spring 68 urges these members firmly against the magnetic tape member 14 in the groove 46 of the pulley. The frictional driving force produced by this apparatus feeds the tape 14 at desired speeds to the magazine.

As the tape passes from the driving pulley 44 it is immediately led into a guide member 74, which is located closely adjacent to the point at which the tape 14 leaves the roller 58. The guide 74 consists of a curved plate which is fastened to the base 4. Along its edge, the guide is provided with an upstanding annular rim 76, in which is formed a channel 78. The width of the channel 78 is of a size slightly greater than the width of the magnetic tape 14, and thus provides a firm supporing track through which the tape passes for a substantial distance. One end of the guide is located very close to the roller 58. The opposite end of the guide 74 is arranged to terminate at a point closely adjacent to the slot 42 in the outer rim of the casing 12, at which point the tape enters the magazine to be passed into the winding.

The importance of the guide 74 is better appreciated from a recognition of the fact that the magnetic tape is very light and thin, may be of various lengths such as thirty feet to one hundred feet or longer, and is travelling at a speed of three feet per second or faster. It should also be observed that the pull exerted during the winding operation in the magazine necessarily fluctuates, with the result that uneven tension may develop. At the same time, the driving force of the pulley 44 may cause the ribbon to buckle or loop, thus seriously interferring with the winding operation. The guide member 74 controls the movement of the tape from the driving pulley to the magazine and prevents buckling or looping by providing a channel with rigid side walls in which the tape is maintained at all points in its path of movement from the driving pulley to the magazine. Positive feeding of the tape into the magazine is achieved since the rigid guide provides for the development of a certain amount of force to be applied at the point of entry of the tape. As a result of this, it becomes possible to provide for uniform feeding of the tape at the point of winding.

In Fig. 1 I have also illustrated means for electrically indicating failure of tension or breaking of the tape, consisting of a block member 84 on which is mounted an electrical contact 82 which is resiliently urged against spring members 80. Movement of the tape tends to draw the contact away from the springs, thus opening the circuit. If failure of tension or breaking of the tape occurs the contact closes the circuit, lighting a warning signal.

The magazine apparatus described provides a number of advantages, including uniform, positive feeding operation of a relatively short endless tape which is adapted for use in recording and reproducing one or more times messages of short duration. The feature of passing the magnetic tape in an angular path with respect to the axis of the body on which it is wound, made possible by the conical drum surface, is very efficient and is thought may be useful in connection with other winding operations than those specified. Similarly, the combination of a guide member with a magazine and driving pulley also affords a uniformity of operation which is particularly effective for handling light, flexible tape or ribbon materials. The magazine member, by reason of its replaceable features, can be snapped into place and taken out at will, which further provides for flexibility in the recording of various types of messages. As illustrated in Fig. 1 of the drawings, the magazines may be used with various types of units as recording heads, reproducing heads, and erasing heads. Various other advantages are present in connection with the maintenance, repair and handling of magnetic tape in connection with recording operations.

While I have shown a preferred embodiment of my invention, it should be understood that various changes and modifications may be resorted to, in keeping with the spirit of the invention as defined by the appended claims.

I claim:

1. Mechanism of the character described comprising a magnetic head, an endless tape associated with the magnetic head, a cylindrical magazine for holding a portion of the tape in a wound state, a conical drum mounted coaxially with said magazine for facilitating removal of the tape from the magazine and passing it to the magnetic head, a resiliently held plunger lying in contact with the tape at its point of contact with the conical drum, driving means located between the magazine and the magnetic head, a channeled guide member for guiding tape from the driving means to the magazine in a substantially stiffened condition, and alarm switch means responsive to any abnormality in the movement of tape about the said magnetic head.

2. Mechanism of the character described comprising a cylindrical casing, a disc disposed in the casing, a magnetic tape wound on the disc, said casing having an opening at the outer periphery thereof for receiving said tape, a cover member for the casing, said cover having a drum portion formed with a conical surface and mounted coaxially with said disc, a portion of said cover being removed to define a curved opening for removing the tape and passing it over the conical surface, plunger means for holding the tape against the conical surface, and means for simultaneously winding and unwinding said tape.

3. An apparatus for simultaneously winding and unwinding a coil of tape, the tape being unwound from the inside of the coil and wound about the outside of the coil, and upon itself, said apparatus including an upper conical surface about which the tape is unwound and a lower adjacent concentric circular surface about which the tape is simultaneously wound, and means for maintaining the entire length of tape under adequate tension.

4. In an apparatus for simultaneously winding and unwinding tape from a coil, the combination of a circularly surfaced reel about which the coil of tape is wound, a cover for said reel disposed coaxially therewith, said cover having a conical surface about which the tape is passed as it is being unwound, means for passing the tape onto said conical surface, and means for maintaining the entire length of tape under the proper tension.

5. An apparatus for simultaneously winding and unwinding a coil of tape and passing it over a recording head in a continuous operation, comprising a rotatably mounted reel about which the tape is wound, a cover for said reel having a conical surface disposed coaxially of said reel and about which the tape is passed as it is unwound, means for passing the tape onto said conical surface, a driven pulley for guiding and driving said tape as it is being wound and unwound and means for maintaining a suitable tension on said tape throughout its length.

6. In an apparatus for simultaneously winding and unwinding tape from a coil, the combination of a circularly surfaced reel about which the coil of tape is wound, a cover for said reel disposed coaxially therewith, said cover having a conical surface about which the tape is passed as it is being unwound, means for passing the tape onto said conical surface, means for maintaining the entire length of tape under suitable tension and for urging said tape against said conical surface.

7. In an apparatus for simultaneously winding and unwinding tape from a coil, the combination of a circularly surfaced reel about which the coil of tape is wound, a cover for said reel disposed coaxially therewith, said cover having a conical surface about which the tape is passed as it is being unwound, means for passing the tape onto said conical surface, means for maintaining the entire length of tape under adequate tension, and means actuated by the movement of said tape for indicating a failure of proper tension or breaking of said tape.

8. An apparatus of the character described comprising a reel about which a coil of tape is simultaneously wound and unwound in a continuous operation, said reel having a circular surface about which the tape is wound and a superposed concentric conical surface about which the tape is unwound, means for passing the tape onto such conical surface, a driven pulley for guiding and moving said tape, and means for maintaining the proper tension upon said tape throughout its length.

ROBERT H. CARSON.

References Cited in the file of this patent

UNITED STATES PATENTS

| Number | Name | Date |
|---|---|---|
| 1,135,846 | Rickon | Apr. 13, 1915 |
| 1,871,235 | Proctor | Aug. 9, 1932 |
| 2,050,011 | McCreary | Aug. 4, 1936 |
| 2,115,503 | Von Mihaly | Apr. 26, 1938 |
| 2,163,870 | Dallenbach | June 27, 1939 |
| 2,183,117 | Daniel | Dec. 12, 1939 |
| 2,288,983 | Weiss | July 7, 1942 |
| 2,307,806 | Schnoor | Jan. 12, 1943 |
| 2,323,215 | Gilman | June 29, 1943 |

FOREIGN PATENTS

| Number | Country | Date |
|---|---|---|
| 457,261 | Great Britain | Nov. 24, 1936 |
| 687,958 | Germany | Feb. 9, 1940 |